(12) United States Patent
Knoll et al.

(10) Patent No.: US 6,404,463 B1
(45) Date of Patent: Jun. 11, 2002

(54) DISPLAY DEVICE

(75) Inventors: Peter Knoll, Ettlingen; Ralf Sybrichs, Ditzingen; Bernhard Herzog, Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/508,702

(22) PCT Filed: Aug. 1, 1998

(86) PCT No.: PCT/DE98/02202

§ 371 (c)(1),
(2), (4) Date: Jun. 1, 2000

(87) PCT Pub. No.: WO99/14070

PCT Pub. Date: Mar. 25, 1999

(30) Foreign Application Priority Data

Sep. 15, 1997 (DE) .......................... 197 40 575

(51) Int. Cl.[7] .......................... G02F 1/13; G01D 11/28; B60K 37/02

(52) U.S. Cl. .......................... 349/1; 349/162; 362/23; 362/489

(58) Field of Search .......................... 349/58, 142, 69, 349/1, 158, 96, 162; 340/461; 362/23, 29, 489; 73/866.3

(56) References Cited

U.S. PATENT DOCUMENTS 4,621,306 A * 11/1986 Sell .......................... 362/29
5,997,161 A * 12/1999 Stringfellow et al. ........ 362/489
6,120,159 A * 9/2000 Inoguchi et al. .............. 362/29

FOREIGN PATENT DOCUMENTS

| DE | 40 23 693 | 3/1991 |
| DE | 42 42 913 | 6/1994 |
| DE | 44 22 828 | 1/1995 |
| DE | 195 00 668 | 7/1996 |

OTHER PUBLICATIONS

H.N Nicholson, Simmonds Precision Products, Inc., Control Engineering, Nov. 1968, pp. 86 and 87.
Don Kardon, Electroluminescent backlights for liquid–crystal displays, Information Display, Feb. 1989, pp. 17–19.

* cited by examiner

Primary Examiner—Kenneth Parker
Assistant Examiner—Tai V. Duong
(74) Attorney, Agent, or Firm—Kenyon & Kenyon

(57) ABSTRACT

A display device is created in particular for a combination instrument of a motor vehicle and has an electro-optic display device; at least one scale device for at least one analog display device which is arranged adjacent to the electro-optic display device, with one section of the scale device covering at least one section (10a; 10b) of the electro-optic display device; and a luminous layer applied to the scale device by which the section of the scale device covering the electro-optic display device as well as the remainder of the scale device can each be lighted at least in part. In this way, space can be saved between the electro-optic display device and the scale device and an esthetic transition is achieved in terms of illumination.

12 Claims, 2 Drawing Sheets

DISPLAY DEVICE

FIELD OF THE INVENTION

The present invention relates to a display device, in particular a display device for a combination instrument of a motor vehicle.

The present invention and its background information are explained here with respect to a display device for a combination instrument in a motor vehicle, although it can be used with any display devices, such as display devices for ships, aircraft, etc.

BACKGROUND INFORMATION

Electronic combination instruments for motor vehicles usually have a plurality of display devices which are accommodated in a common housing and can be read by the driver from the front side through a transparent cover panel. Both analog pointer-type display devices and digital display devices are generally used with such combination electronic instruments.

With analog pointer-type display devices, a pointer mounted on a shaft is driven by a controlled pointer drive to provide an analog display of information such as speed, rpm, coolant temperature, oil temperature, fuel tank level and the like on a corresponding dial or a scale device.

For some time, electro-optic display devices (also known as displays) have been used as digital display devices in such combination instruments in motor vehicles to display any desired information such as warning functions, radio displays, telephone displays, traffic control information, etc.

In the past mainly LED (LED=light emitting diode) displays have been used for this purpose. In addition, LCDs (LCD=liquid crystal display) have also been used, and in individual cases VFDs or vacuum fluorescent displays and even other exotic known technologies have been used for display devices, such as plasma displays.

Because of their mechanical design, in particular the electric contacting, these displays usually have an edge which projects at the side beyond the usable display surface. This edge area is typically 5 to 15 mm in size.

With the combination instruments in question, such displays are directly adjacent to pointer-type displays with dials or scales which must be lighted from the rear at night to permit good visibility and an attractive design. At the same time, the dials or scales should be arranged approximately in the same plane as the displays for design reasons.

However, the above-mentioned edge of the displays does not allow uniform lighting of the immediately adjacent areas from the rear using conventional methods such as fiber optics (German Patent No. 42 42 913 from MOTOMETER) or lighting wells (German Patent No. 44 22 828 from SAGEM).

Thus, the fact that lighting from the rear cannot be designed to be uniform and is thus not esthetic has proven to be a disadvantage with such combination instruments.

Furthermore, the edge of the displays is a previously unused area in the restricted space available on a combination instrument.

SUMMARY OF THE INVENTION

The display device according to the present invention has the advantage that overlapping of the scale device and the electro-optic display device is possible while at the same time guaranteeing uniform lighting.

This yields a more compact design for the mechanical construction and furthermore makes the display device according to the present invention more esthetically appealing. The display device according to the present invention is especially advantageous when larger displays claiming a large portion of the area of the combination instrument are used. The resulting small remaining area for dials can then be used more efficiently. In addition, it is possible to mask areas of any shape in the display area using dials and to light them uniformly with the rest of the dial.

The idea on which the present invention is based is to apply a thin luminous layer to the scale device by which the section of the scale device covering the electro-optic display device as well as the remainder of the scale device can each be lighted at least in part.

According to a preferred refinement, the electro-optic display device has a display area in its section covered by the scale device.

According to another preferred embodiment, the section of the scale device covering the electro-optic display device is transparent, translucent or recessed in some areas, so that the appearance of the scale device through the display area of the electro-optic display device can be influenced. This offers the particular advantage that the scales can be varied according to the operating conditions of the vehicle or according to the driver's wishes through appropriate control of the electro-optic display device.

According to another preferred refinement, the scale device has a transparent plastic panel and a scale layer printed on one side.

According to another preferred refinement, the scale layer is printed on the side facing away from the observer. This design ensures a uniform depth impression with regard to the scale device and the electro-optic display device for the observer.

According to another preferred refinement, the luminous layer is applied to the scale layer.

According to another preferred refinement, the luminous layer is an electroluminescent layer.

According to another preferred refinement, the electroluminescent layer is integrated into an electroluminescent film which preferably has a thickness in the range of 0.3 to 0.6 mm. This results in only minimal unevenness between the scale device and the electro-optic display device.

According to another preferred refinement, the analog display device has a mechanical pointer which travels over a plane facing the observer above the scale device.

According to another preferred refinement, the electro-optic display device has an LED display and/or a vacuum fluorescence display.

According to another preferred refinement, the electro-optic display device has a liquid crystal display.

According to another preferred refinement, the polarization filter layer of the liquid crystal display and the carrier of the luminous layer together form one unit. This simplifies the mechanical design of the display device.

DETAILED DESCRIPTION

The same reference numbers in the figures denote the same parts or parts having the same function.

Figure 1:
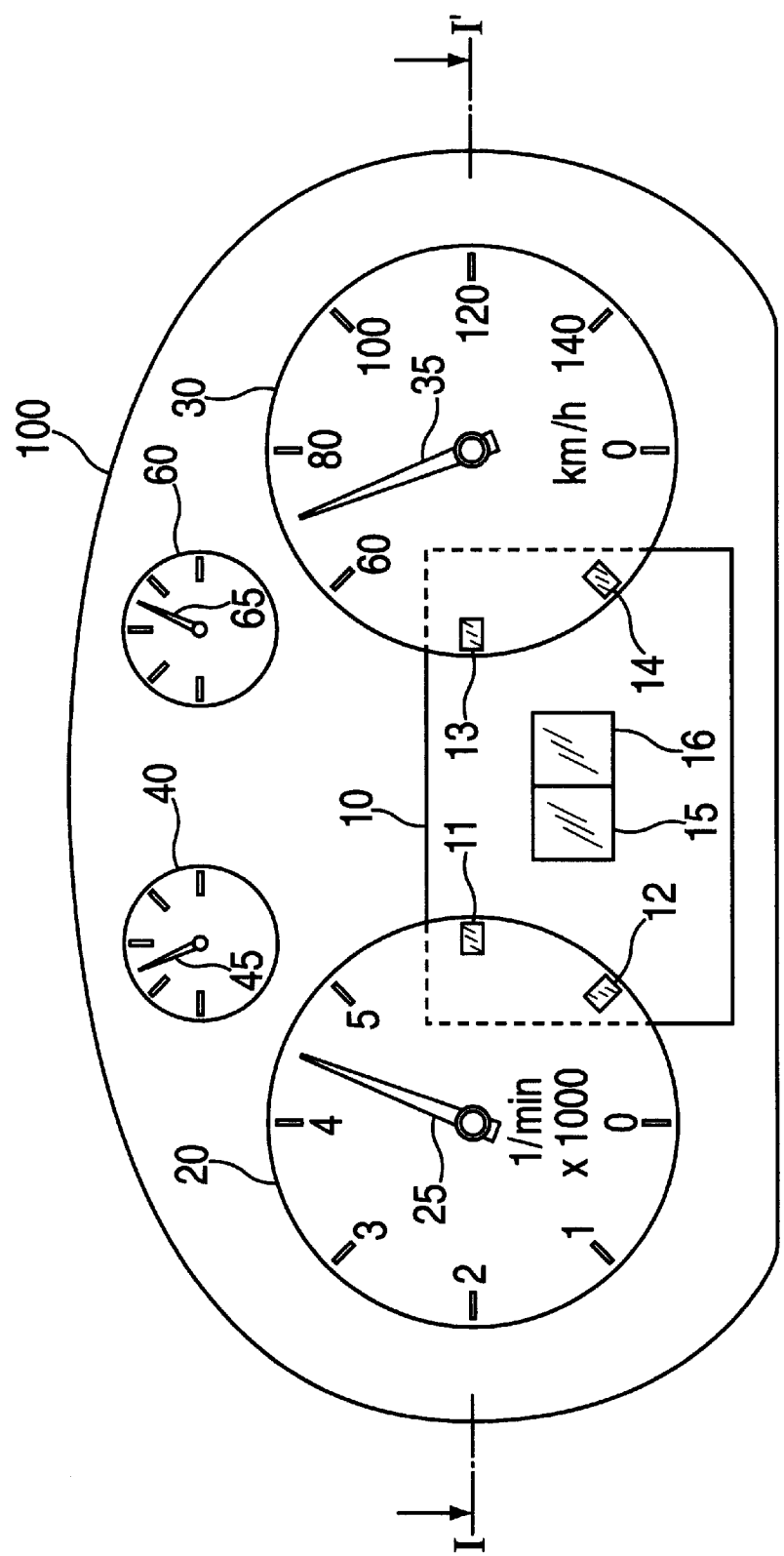
FIG. 1 shows a schematic top view to illustrate an embodiment of the display device according to the present invention as part of a combination instrument in a motor vehicle.

FIG. 1 shows a schematic top view to illustrate an embodiment of the display device according to the present invention as part of a combination instrument in a motor vehicle.

FIG. 1 shows a combination instrument 100 of a motor vehicle, an electro-optic display device 10 in the form of a liquid crystal display, different display areas 11–16 of liquid crystal display 10, a first scale device 20, a pointer 25 for first scale device 20, a second scale device 30, a pointer 35 for second scale device 30, a third scale device 40, a pointer 45 for third scale device 40, a fourth scale device 60 and a pointer 65 for fourth scale device 60.

First scale device 20 together with pointer 25 forms an rpm display. Second scale device 30 together with pointer 35 forms a speed display. Third scale device 40 together with pointer 45 forms a fuel tank level display. Fourth scale device 60 together with pointer 55 forms a coolant temperature display.

As shown by the dotted lines in FIG. 1, a section of scale devices 20, 30 in each case covers a corresponding section of liquid crystal display 10. In these sections, two display areas 11, 12 and 13, 14 are provided in liquid crystal display 10 and are visible for the observer through appropriately designed windows in respective scale device 20 or 30.

With regard to the rpm display, this makes it possible for pointer 25 to indicate the instantaneous rpm, with the warning range for excessively high rpm being controlled variably on scale device 20, namely according to the type of engine, the operating parameters of the engine, etc. In other words, display area 11, for example, may display either a red "6" or a green "6," and display area 12 may display either a red "7" or a green "7."

With regard to the speed display, this allows pointer 35 to display the instantaneous speed, with the warning range for excessively high speeds or for a cruise control setting being variable. In other words, display area 13, for example, may display either a red "40" or a green "40," and display area 14 may display either a red "20" or a green "20."

Figure 2:
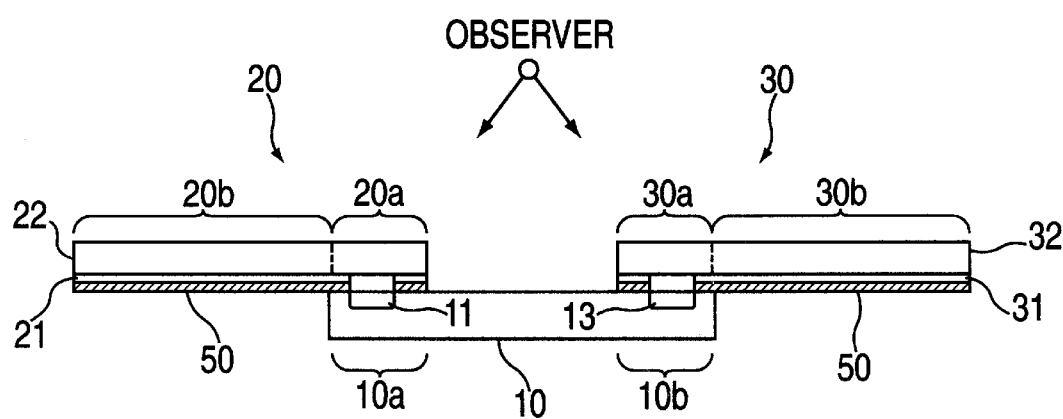
FIG. 2 shows a cross-sectional view of the embodiment of the display device according to the present invention along line A—A' in FIG. 1.

FIG. 2 illustrates a cross-sectional view of the embodiment of the display device according to the present invention along line A—A' in FIG. 1.

FIG. 2 shows sections 10a, 10b of liquid crystal display 10 overlapped by scale device 20 and 30, respectively. Overlapping sections of scale device 20 and 30, respectively, are labeled as 20a, 30a, and non-overlapping sections of scale device 20 and 30, respectively, are labeled as 20b, 30b. Scale layer 21 is provided on first scale device 20, and a transparent plastic panel 22 is provided for first scale device 20. Scale layer 31 is provided on second scale device 30, and a transparent plastic panel 32 is provided on first scale device 20. Finally, there is an electroluminescent layer 50 in the form of an electroluminescent film which preferably has a thickness in the range of 0.3 to 0.6 mm and is applied to the side of scale layer 21 and 31, respectively, facing away from the observer, preferably by adhesive bonding.

It is clearly apparent that section 20a, 30a of scale device 20 and 30, respectively, in each case covering liquid crystal display 10 is transparent in some areas, i.e., luminescent layer 50 and scale layers 21 and 31 have recesses, so that the appearance of respective scale device 20 or 30 through display area 11 or 13 can be influenced. In other words, display areas 11 and 13 form above-mentioned variable numerals "6" and "40" of scale devices 20 and 30. An electronic control unit (not shown) can determine specifically what is shown in each recess.

Due to this design, in particular due to luminous layer 50 applied in this way, respective section 20a, 30a of scale device 20 and 30, respectively, covering liquid crystal display 10 and respective remainder 20b, 30b of scale device 20 and 30, respectively, can each be illuminated at least somewhat uniformly, with the overlap offering a considerable advantage with regard to space.

Although the present invention has been described above on the basis of a preferred embodiment, it is not limited to this embodiment but instead can be modified in a variety of ways.

In particular, with the above embodiment only certain numerical ranges of the first and second scale device overlap with the liquid crystal display. However, larger ranges may also overlap, and in fact the entire scale device may overlap. Thus, for example, all information directly related to the analog display may be represented variably, e.g., for different units of measure for speed, temperature, pressure, etc. In particular, the ranges between the scales may be designed with variable colors and/or contrast.

The scale layer may also be applied to the side of the plastic panel facing the observer or it may be integrated into the plastic panel, although the embodiment shown here imparts the most uniform depth impression.

In the example shown here, the overlapping area of the liquid crystal display contains display areas, but the essential advantages according to the present invention can already be achieved when only one overlapping edge area of the liquid crystal display without including any display areas is involved.

The electroluminescent film may also be designed in one piece with a scale film, e.g., in the form of a joint film or a laminate of multiple films with the scale printed on the front side and with the electroluminescent layer on the back side.

It should be pointed out in this connection that the liquid crystal display generally has a frame or a border which produces a shoulder at the edge. In such a case, it is expedient to use such a common film or such a laminate of multiple films which is preferably produced by a vacuum deep-drawing method to produce a corresponding shoulder. Otherwise, a transparent spacer would have to be used on the framed area of the liquid crystal display to compensate for the shoulder.

The plastic panel may also be eliminated if the film(s) having a numerical dial imprint or a luminous layer printed on them have sufficient rigidity or if a numerical dial carrier is provided on the rear side.

What is claimed is:

1. A display device for a combination instrument for a motor vehicle, comprising:
   an electro-optic display device;
   at least one scale device for at least one analog display device, the at least one scale device being situated adjacent to the electro-optic display device, the at least one scale device having at least one covering section covering at least one section of the electro-optic display device, the electro-optic display device having at least one display area situated outside an area covered by the at least one scale device; and
   a luminous layer applied to the at least one scale device for lighting, at least in part, the at least one covering section and a remainder of the at least one scale device.

2. The display device according to claim 1, wherein the electro-optic display device has a display area in the at least one section that is covered by the at least one scale device.

3. The display device according to claim 2, wherein the at least one covering section is at least one of transparent, translucent and recessed in particular areas, for influencing an appearance of the at least one scale device through the display area.

4. The display device according to claim 1, wherein the at least one scale device includes a transparent plastic panel and a scale layer printed on one side.

5. The display device according to claim 4, wherein the one side faces away from an observer.

6. The display device according to claim 4, wherein the luminous layer is applied to the scale layer.

7. The display device according to claim 1, wherein the luminous layer is an electroluminescent layer.

8. The display device according to claim 7, wherein the electroluminescent layer is integrated into an electroluminescent film having a thickness in a range of 0.3 to 0.6 mm.

9. The display device according to claim 1, wherein the at least one analog display device includes a mechanical pointer which travels over a plane facing an observer above the at least one scale device.

10. The display device according to claim 1, wherein the electro-optic display device includes at least one of an LED display and a vacuum fluorescence display.

11. The display device according to claim 1, wherein the electro-optic display device includes a liquid crystal display.

12. The display device according to claim 11, wherein the liquid crystal display includes a polarization filter layer and the luminous layer includes a carrier, the polarization filter layer and the carrier together forming one unit.

* * * * *

UNITED STATES PATENT AND TRADEMARK OFFICE
CERTIFICATE OF CORRECTION

PATENT NO.    : 6,404,463 B1
DATED         : June 11, 2002
INVENTOR(S)   : Knoll et al.

It is certified that error appears in the above-identified patent and that said Letters Patent is hereby corrected as shown below:

<u>Title page,</u>
Item [57], ABSTRACT,
Line 6, delete "(10$a$:10$b$)"

Signed and Sealed this

Fourteenth Day of October, 2003

JAMES E. ROGAN
*Director of the United States Patent and Trademark Office*